Feb. 23, 1932.   P. F. SHIVERS   1,847,038
STACK THERMOSTAT
Original Filed Nov. 23, 1925
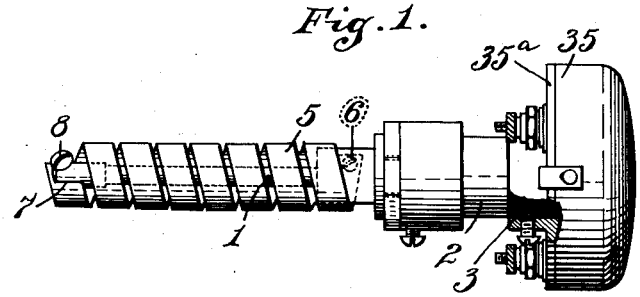
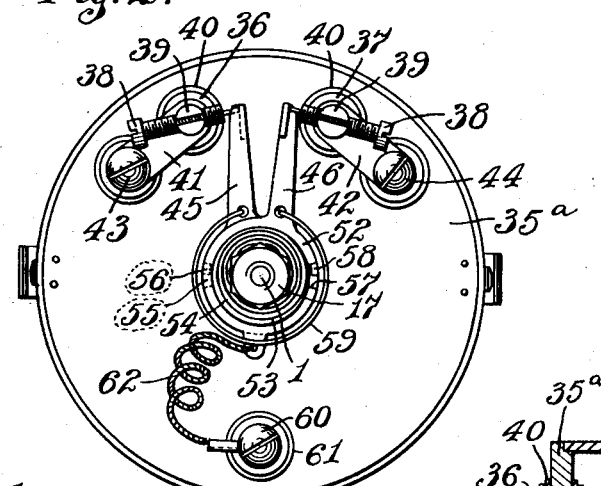
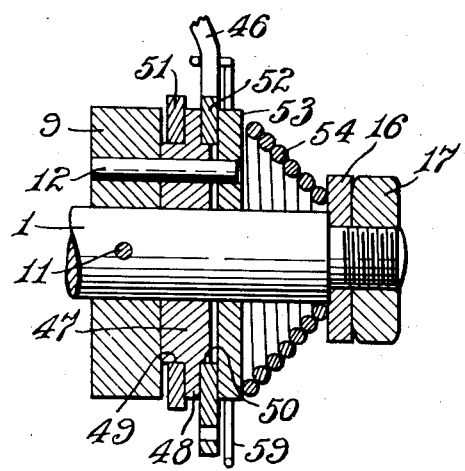
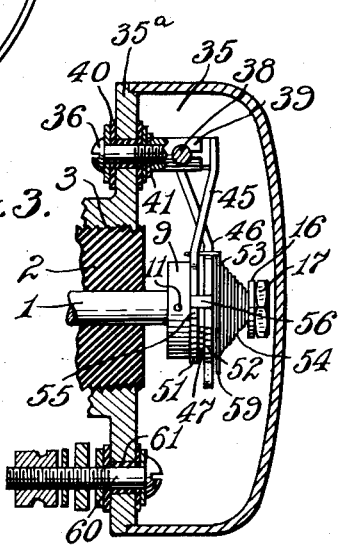
INVENTOR.
Paul F. Shivers,
BY
Hood + Hahn
ATTORNEYS Patented Feb. 23, 1932

1,847,038

UNITED STATES PATENT OFFICE

PAUL F. SHIVERS, OF WABASH, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

STACK THERMOSTAT

Original application filed November 23, 1925, Serial No. 70,808. Divided and this application filed January 6, 1932. Serial No. 585,095.

My invention relates to thermostatically-operated switches for controlling the circuit through various electrical devices such for instance as electric motors for operating oil burning apparatus for heat and other boilers, furnaces and the like.

One of the objects of my invention is to provide a thermostatic operating device for such switches in which there shall be no lag in the operation of the switches when the thermostatic element responds to changes in temperature to move the switches in one direction or the other.

Another object of my invention is to provide, in a thermostatically-controlled switch means whereby continued movement of the thermostat under temperature conditions, after having completed the operation of the switch, will not affect or injure the switch.

A further object of my invention is to provide a thermostatically-operated switch wherein even though the thermostatic element continues its movement under the influence of temperature conditions, after having manipulated the switch, a reversal of movement under a change of temperature conditions will immediately cause the operation of the switch.

The present application is a division from my copending application Serial No. 70,808, filed November 23rd, 1925.

For the purpose of disclosing my invention I have illustrated an embodiment thereof in the accompanying drawings in which Fig. 1 is a side elevation of an apparatus embodying my invention; Fig. 2 a front elevation thereof with the casing cover removed; Fig. 3 a fragmentary longitudinal section on a larger scale, and Fig. 4 an enlarged detail section of the contact driving connection.

In the drawings 1 indicates a shaft or spindle journaled in a bushing 2 of insulating material and projecting from each end thereof. One of the projecting ends of spindle 1 is bifurcated to receive, as indicated at 7, one end of a helical bimetallic thermostatic element 5 held in place by screw 8. The other end of said bimetallic element 5 is anchored at 6, on bushing 2.

The coil 5 is formed of any suitable thermostatic material, preferably of metallic structure, which will expand and contract under variations in temperature, preferably expanding under the influence of heat and contracting under the influence of cold. Therefore, due to the construction of the thermostatic element 5 in the structure illustrated, when the coil is subjected to heat, it will tend to rotate the spindle 1 in one direction and when the temperature begins to lower will rotate the spindle in the opposite direction.

The opposite end of bushing 2 is threaded at 3 to receive a casing base 35a, complemented by a cup 35.

Base 35a carries a pair of stationary contacts 36 and 37 each of which comprises an adjustable screw 38 mounted in a post 39, insulated by insulating bushings 40 from the casing, and the contacts 36 and 37 are respectively connected by conductors 41 and 42 with binding terminals 43 and 44.

Mounted on that end of shaft 1 which protrudes into casing 35 is a collar 9 pinned to the shaft by pin 11. Collar 9 carries a pin 12 parallel with the axis of shaft 1.

Slidably mounted on shaft 1 and splined thereto by means of pin 12 is a metal disc 47 having a medial circumferential flange 48 so as to provide two circumferential shoulders 49 and 50 upon which are respectively journaled the two metal rings 51 and 52 which carry respectively the radially-projecting contact arms 45 and 46 which are adapted to contact respectively with the contact screws 38 of the contacts 36 and 37.

Shoulder 49 has an axial depth slightly greater than the thickness of ring 51 while shoulder 50 has an axial depth slightly less than the thickness of ring 52.

Splined upon shaft 1, by means of pin 12, is a friction ring 53 which is yieldingly urged against ring 52 by means of a spring 54 abutting against an abutment collar 16 which may be adjustably positioned axially of the shaft by means of the nut 17.

In the outer periphery of ring 51 I form an elongated notch 55 in which lies an ear 56 carried by ring 52, and on the opposite side of ring 52 I form a similar notch 57 in which lies an ear 58 on ring 51. The ears and notches are so proportioned as to permit a slight relative angular movement between the two arms 45 and 46 and these two arms are yieldingly urged to their spread positions by a spring 59 the ends of which are anchored to arms 45 and 46 respectively.

A terminal post 60 is mounted in base 35 through a suitable insulating bushing 61 and this terminal is electrically connected by a conductor 62 with ring 52 and, through ring 47 is also eletrically connected with ring 51.

The spacing between the contacts 36 and 37 is such that, when the arms 45 and 46 are separated to their greatest extent by spring 59, these arms cannot make simultaneous engagement with their respective contacts, as illustrated in Fig. 2.

In operation, assuming the parts to be in the position illustrated in Fig. 2, with the switch arm 46 engaging the screw 38 of contact 37, and with the switch arm 45 slightly out of engagement with the screw 38 of contact 36, if the spindle 1 is rotated in a counter-clockwise direction under the influence of the thermostatic element 5, the arm 46 will be rotated in counter-clockwise direction through the frictional driving clutch out of engagement with contact 37 and will move arm 45, through the spring 59, in a counter-clockwise direction into engagement with its contact 36. The disengagement of arm 46 and engagement of arm 45 is almost simultaneous, due to the fact that the space between the arms is so nearly equal to the space between the contacts. When arm 45 engages its contact 36 it will be held against further movement and arm 46 may continue to move for a slight distance until the ear 56 engages the bottom wall of notch 55 and the ear 58 engages the top wall of notch 57, when arm 46 will be stopped against further movement and a continued rotation of the spindle 1 will not affect the switching mechanism due to the slipping of the clutching mechanism. Circuit will now be closed through the contact 36 and opened at contact 37. If now the spindle 1 is rotated in a clockwise direction the arm 46 will be moved in a clockwise direction, the arm 45 however, remaining stationary due to the tendency of the spring 59 to spread the arms 45 and 46 apart, until the arm 46 is almost in a position to engage its contact 37, by which time the ear 56 will have moved into engagement with the top of the notch 55 and ear 58 will have moved into engagement with the bottom of notch 57 so that the slight continued movement of the arm 46 into engagement with its contact 37 will at the same time move the arm 45 out of engagement with its contact 36. After the arm 46 has come to a stop and rests on its contact 37 the continued rotation of the spindle 1 under the influence of the thermostatic element 5 will not affect the switches due to the slippage of the friction clutch.

I claim as my invention:

1. A thermostat comprising a pair of oscillating arms having a lost-motion connection therebetween, means tending to separate said arms to the extent of said lost-motion connection, a rotatable spindle, thermostatic means for rotating said spindle, a friction driving connection between one of said arms and said spindle and stop members for said arms.

2. A thermostat comprising a main body, a shaft journaled in said main body, a thermostatic element anchored upon said main body, and connected with the shaft to rotate the same upon change of temperature, a collar anchored upon said shaft, two friction collars splined upon the shaft, a contact arm journaled upon one of said friction collars between it and the first-mentioned collar, a second contact-carrying arm journaled upon one of said friction collars and arranged between the two friction collars and frictionally engaged thereby, a lost-motion connection between said contact-carrying arms, and a spring biasing said terminal-carrying arms to one limit of said lost-motion connection.

3. A thermostat comprising a main body, a shaft journaled in said main body, a thermostatic element of the helical type anchored upon said main body, co-axial with the shaft and connected with the shaft to rotate the same upon change of temperature, a collar anchored upon said shaft, two friction collars splined upon the shaft, a contact arm journaled upon one of said friction collars, between it and the first-mentioned collar, a second contact-carrying arm journaled upon one of said friction collars and arranged between the two friction collars and frictionally engaged thereby, a lost-motion connection between said contact-carrying arms, and a spring biasing said terminal-carrying arms to one limit of said lost-motion connection.

In witness whereof I have hereunto set my hand at Wabash, Indiana, this 31st day of December, A. D. one thousand nine hundred and thirty-one.

PAUL F. SHIVERS.